US012361584B2

(12) United States Patent
Chen et al.

(10) Patent No.: US 12,361,584 B2
(45) Date of Patent: Jul. 15, 2025

(54) VIDEO PROCESSING METHOD FOR DETECTING LOCATION, PIXELS, AND SKELETON OF OBJECT, AND ASSOCIATED VIDEO PROCESSING CIRCUIT

(71) Applicant: MEDIATEK INC., Hsin-Chu (TW)

(72) Inventors: Hsing-Yu Chen, Hsinchu (TW); Cheng-Wei Wu, Hsinchu (TW); Shu-Ping Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 354 days.

(21) Appl. No.: 17/878,885

(22) Filed: Aug. 1, 2022

(65) Prior Publication Data
US 2023/0085518 A1  Mar. 16, 2023

Related U.S. Application Data

(60) Provisional application No. 63/243,761, filed on Sep. 14, 2021.

(51) Int. Cl.
*G06T 7/70* (2017.01)
*G06T 7/10* (2017.01)
*G06V 10/77* (2022.01)
*G06V 10/82* (2022.01)
*G06V 40/10* (2022.01)

(52) U.S. Cl.
CPC .................. *G06T 7/70* (2017.01); *G06T 7/10* (2017.01); *G06V 10/7715* (2022.01); *G06V 40/103* (2022.01); *G06T 2207/10024* (2013.01); *G06V 2201/07* (2022.01)

(58) Field of Classification Search
CPC ... G06T 7/70; G06T 7/10; G06T 2207/10024; G06V 10/7715; G06V 40/103; G06V 2201/07
See application file for complete search history.

(56) References Cited

U.S. PATENT DOCUMENTS

| 8,630,457 B2 * | 1/2014 | Craig .................... G06V 40/23 382/103 |
| 11,074,711 B1 * | 7/2021 | Akbas ................. G06V 10/454 |
| 11,210,557 B2 * | 12/2021 | Sato .................... G06F 18/2148 |

(Continued)

FOREIGN PATENT DOCUMENTS

| CN | 112270249 A | 1/2021 |
| CN | 113255429 A | 8/2021 |
| TW | 202105237 A | 2/2021 |

*Primary Examiner* — John Villecco
*Assistant Examiner* — Kyla Guan-Ping Tiao Allen
(74) *Attorney, Agent, or Firm* — Winston Hsu

(57) ABSTRACT

A video processing method for detecting location(s), pixels, and skeleton(s) of one or more objects and an associated video processing circuit are provided. The video processing method may include: utilizing a backbone network in a predetermined model of a single deep learning network to receive and convert input image data having the object(s) into at least one feature map; and utilizing at least one instance head and a pixel head in the predetermined model of the single deep learning network to receive and convert the aforementioned at least one feature map into one or more object detection results, one or more instance segmentation results and one or more pose estimation results of the object(s).

28 Claims, 11 Drawing Sheets

(56) References Cited

U.S. PATENT DOCUMENTS

| | | | |
|---|---|---|---|
| 2012/0027304 A1* | 2/2012 | Brown | G06V 30/2504 |
| | | | 382/190 |
| 2016/0275376 A1* | 9/2016 | Kant | G06F 18/2415 |
| 2020/0105014 A1* | 4/2020 | Agnihotram | G06T 7/75 |
| 2020/0175713 A1* | 6/2020 | Pescaru | G06V 40/103 |
| 2020/0272888 A1* | 8/2020 | Wang | G06V 40/103 |
| 2021/0019507 A1* | 1/2021 | Brookshire | G06V 10/764 |
| 2021/0097718 A1* | 4/2021 | Fisch | G06V 40/23 |
| 2021/0209397 A1 | 7/2021 | Phan | |
| 2021/0264144 A1* | 8/2021 | Cho | G06V 40/103 |
| 2021/0279511 A1* | 9/2021 | Gordon | G06V 10/774 |
| 2022/0044114 A1* | 2/2022 | Sriram | G06N 3/045 |

\* cited by examiner

VIDEO PROCESSING METHOD FOR DETECTING LOCATION, PIXELS, AND SKELETON OF OBJECT, AND ASSOCIATED VIDEO PROCESSING CIRCUIT

CROSS REFERENCE TO RELATED APPLICATIONS

This application claims the benefit of U.S. Provisional Application No. 63/243,761, filed on Sep. 14, 2021. The content of the application is incorporated herein by reference.

BACKGROUND

The present invention is related to live video processing, and more particularly, to a video processing method for detecting a location, pixels, and a skeleton of an object, and an associated video processing circuit.

Live video streaming have been widely used in various applications such as surveillance system, video conference, etc. In some situations, for example, when using a surveillance system to monitor an important region, detecting objects in an image of a video stream may be needed. According to the related art, artificial neural network technologies may be helpful on achieving object detection. However, some problems may occur. More particularly, when detecting a plurality of persons in the image as well as the pixels respectively belonging to the persons within the image and the respective actions of the persons are required, a multi-stage model may be used, but there are certain limitations. For example, the end-to-end inference time of the multi-stage model may significantly increase when the number of instances (e.g., persons) increases and reaches twenty or more, causing the overall performance to be reduced. Thus, there is a need for a novel method and associated architecture to realize an electronic device with reliable detection control without introducing any side effect or in a way that is less likely to introduce side effects.

SUMMARY

It is an objective of the present invention to provide a video processing method for detecting a location, pixels, and a skeleton of an object, and an associated video processing circuit, in order to solve the above-mentioned problems.

At least one embodiment of the present invention provides a video processing method for detecting a location, pixels, and a skeleton of an object, where the video processing method may comprise: utilizing a backbone network in a predetermined model of a single deep learning network to receive input image data having the object and to convert the input image data into at least one feature map; and utilizing at least one instance head and a pixel head in the predetermined model of the single deep learning network to receive the at least one feature map and to convert the at least one feature map into an object detection result, an instance segmentation result and a pose estimation result of the object, for indicating the location, the pixels, and the skeleton of the object, respectively.

At least one embodiment of the present invention provides a video processing circuit for detecting a location, pixels, and a skeleton of an object, where the video processing circuit may comprise a first processing circuit, and a second processing circuit coupled to the first processing circuit. For example, the first processing circuit can be configured to act as a backbone network in a predetermined model of a single deep learning network to receive input image data having the object and to convert the input image data into at least one feature map. In addition, the second processing circuit can be configured to act as at least one instance head and a pixel head in the predetermined model of the single deep learning network to receive the at least one feature map and to convert the at least one feature map into an object detection result, an instance segmentation result and a pose estimation result of the object, for indicating the location, the pixels, and the skeleton of the object, respectively.

According to some embodiments, the object may represent any object among multiple objects in the input image, wherein the object detection result, the instance segmentation result, and the pose estimation result may represent an object detection result of the aforementioned any object among multiple object detection results of the multiple objects, an instance segmentation result of the aforementioned any object among multiple instance segmentation results of the multiple objects, and a pose estimation result of the aforementioned any object among multiple pose estimation results of the multiple objects, respectively.

It is an advantage of the present invention that, through carefully designed detection mechanism, the video processing method and the video processing circuit provided by the present invention can simultaneously output the locations, the pixels, and the skeletons of the multiple objects through image processing (e.g., highlighting the multiple objects with the multiple object detection results, the multiple instance segmentation results and the multiple pose estimation results) with aid of the predetermined model (e.g., a single-stage model), to achieve excellent overall performance. In addition, the time and the power consumption of converting the input image into the multiple object detection results, the multiple instance segmentation results and the multiple pose estimation results by the predetermined model of the single deep learning network is independent of the object count of the multiple objects. For example, when the number of instances (e.g., persons) increases and reaches twenty or more, and even reaches one hundred or more, the end-to-end inference time of the predetermined model (e.g., the single-stage model) will not significantly increase, and more particularly, can remain almost unchanged. In comparison with the related art, the video processing method and the video processing circuit provided by the present invention can realize an electronic device with reliable detection control without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
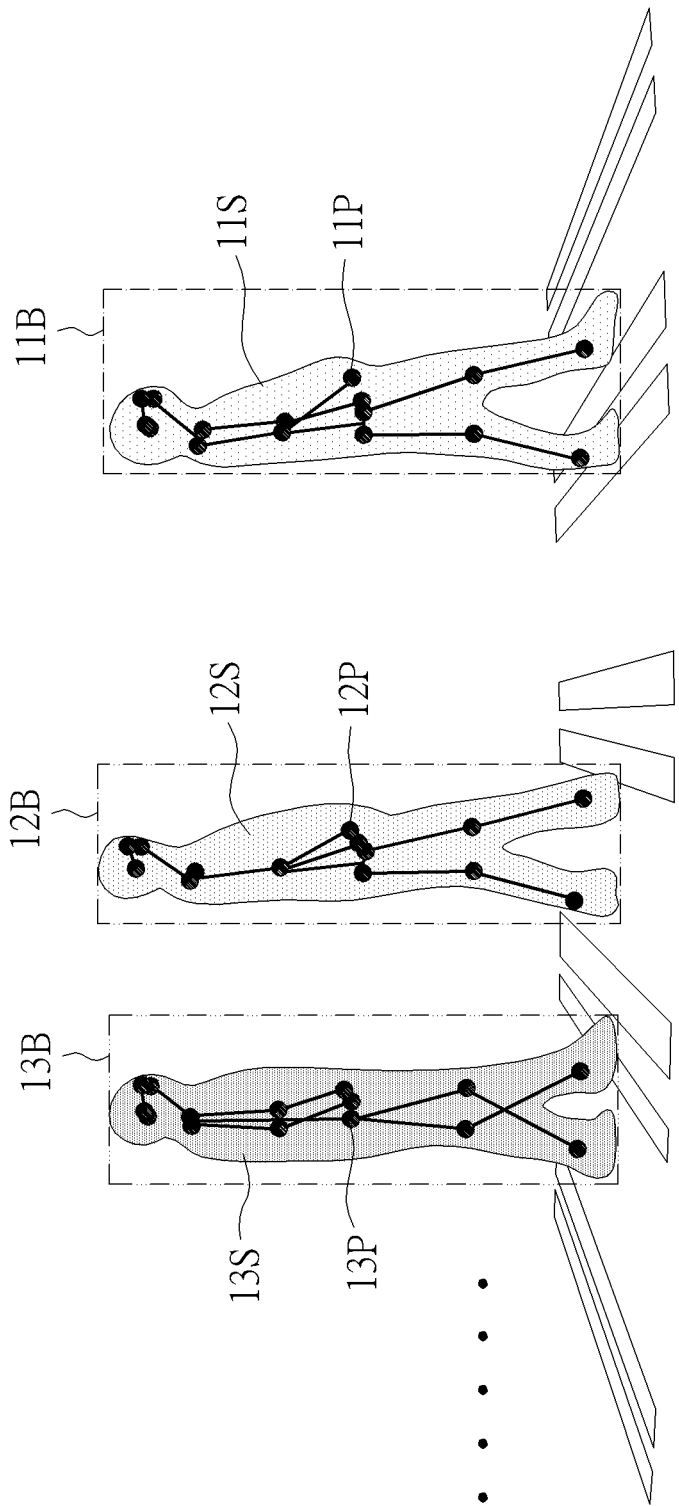
FIG. 1 is a diagram illustrating a Human Trinity detection control scheme of a video processing method for detecting a location, pixels, and a skeleton of an object according to an embodiment of the present invention.

FIG. 1 is a diagram illustrating a Human Trinity detection control scheme of a video processing method for detecting a location, pixels, and a skeleton of an object according to an embodiment of the present invention. For better comprehension, the object may represent any object among multiple objects in an input image (e.g., input image data thereof), where an object detection result of the object, an instance segmentation result of the object, and a pose estimation result of the object that are obtained in the video processing method may represent an object detection result of the aforementioned any object among multiple object detection results of the multiple objects, an instance segmentation result of the aforementioned any object among multiple instance segmentation results of the multiple objects, and a pose estimation result of the aforementioned any object among multiple pose estimation results of the multiple objects, respectively, but the present invention is not limited thereto. According to some embodiments, the input image (e.g., the input image data thereof) may comprise a single object, and the object may represent the single object in the input image (e.g., the input image data thereof), where the object detection result of the object, the instance segmentation result of the object, and the pose estimation result of the object that are obtained in the video processing method may represent an object detection result of the single object, an instance segmentation result of the single object, and a pose estimation result of the single object, respectively.

For example, an electronic device that operates according to the Human Trinity detection control scheme of video processing method can be arranged to obtain video stream through a camera, and to detect the locations, the pixels, and the skeletons of the multiple objects in the input image (e.g., the input image data thereof) carried by the video stream at the same time. More particularly, the electronic device that operates according to the Human Trinity detection control scheme of video processing method can be configured to simultaneously perform three types of processing such as object detection (e.g., human detection), instance segmentation and pose estimation in one-stage processing, in order to generate and output associated processing results such as multiple object detection results 11B, 12B, 13B, etc., multiple instance segmentation results 11S, 12S, 13S, etc. and multiple pose estimation results 11P, 12P, 13P, etc. of the multiple objects, respectively, for indicating the locations (e.g., object locations), the pixels (e.g., object pixels), and the skeletons (e.g., object skeletons) of the multiple objects, respectively.

For better comprehension, the multiple object detection results 11B, 12B, 13B, etc. may comprise human detection results, which can be optionally illustrated with boxes (e.g., instance-level person boxes) enclosing the persons that are detected, the multiple instance segmentation results 11S, 12S, 13S, etc. may comprise instance pixels, which can be optionally illustrated with highlighted pixels of predetermined masks (e.g., segmentation masks), having predetermined contours, predetermined shadings and/or predetermined hues thereon, respectively, and the multiple pose estimation results 11P, 12P, 13P, etc. may comprise main skeletons, which can be optionally illustrated with imaginary bones connected with imaginary joints, such as sticks connected with circles in a cartoon style, as poses indications of poses, where the scene may be illustrated as human objects walking across the road, but the present invention is not limited thereto. According to some embodiments, the scene, the type of objects, the number of objects, and/or the ways of highlighting the multiple objects with the multiple object detection results 11B, 12B, 13B, etc., the multiple instance segmentation results 11S, 12S, 13S, etc. and the multiple pose estimation results 11P, 12P, 13P, etc. may vary. Examples of the electronic device may include, but are not limited to: a surveillance host device such as a host device of a surveillance system, an action recognition host device such as a host device of an action recognition system, an autonomous driving host device such as a host device of an autonomous driving system, an artificial intelligence (AI)-fitness coach host device such as a host device of an AI-fitness coach system, and a mobile device such as a multifunctional mobile phone.

Figure 2:
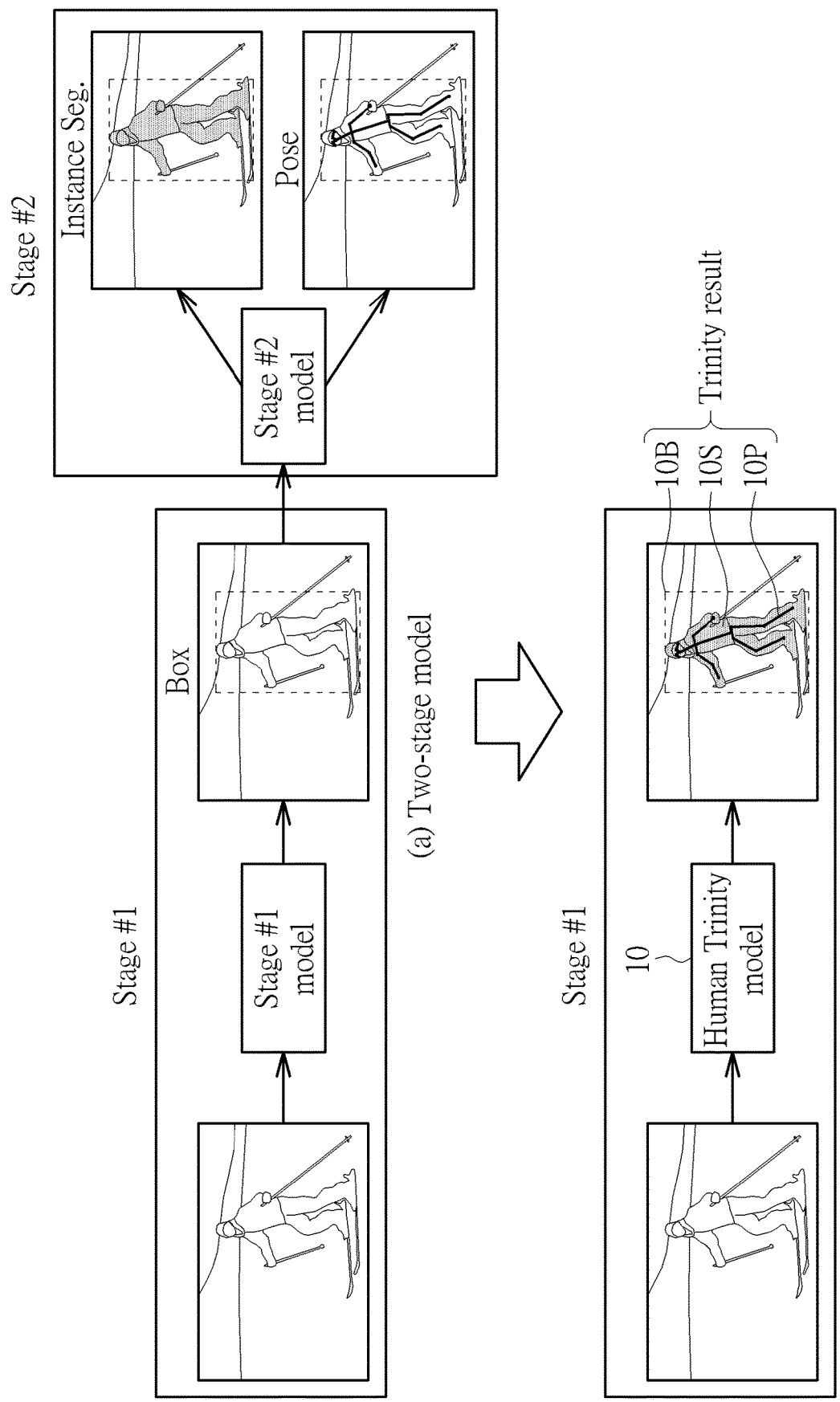
FIG. 2 illustrates, in the lower half thereof, a one-stage model control scheme of the video processing method according to an embodiment of the present invention, where the upper half of FIG. 2 illustrates a two-stage model control scheme for better comprehension.

FIG. 2 illustrates, in the lower half thereof, a one-stage model control scheme of the video processing method according to an embodiment of the present invention, where the upper half of FIG. 2 illustrates a two-stage model control scheme for better comprehension. As shown in the upper half of FIG. 2, a stage #1 model of the two-stage model control scheme may operate in stage #1 to obtain a detected location such as a box indicating the location of the person, and a stage #2 model of the two-stage model control scheme may operate according to the detected location in stage #2 to obtain an instance segmentation result and a pose estimation result (respectively labeled "Instance Seg." and "Pose" for brevity). For example, the end-to-end inference time of the two-stage model may significantly increase when the number of instances (e.g., persons) increases and reaches twenty or more, causing the overall performance to be reduced. As shown in lower half of FIG. 2, a Human Trinity model 10 of the one-stage model control scheme may operate in a single stage such as stage #1 to obtain an object detection result 10B (which can be illustrated with a box enclosing the person that is detected), an instance segmentation result 10S and a pose estimation result 10P simultaneously (labeled "Trinity result" for better comprehension). Please note that an object being detected as shown in FIG. 2 (e.g., the shape and the size thereof) is for illustrative purposes only, and is not meant to be a limitation of the present invention.

Taking the electronic device that operates according to the video processing method as an example, the electronic device can be configured to simultaneously perform the three types of processing such as the object detection (e.g., human detection), the instance segmentation and the pose estimation in the one-stage processing with aid of a predetermined model of a single deep learning network, such as the Human Trinity model 10, to simultaneously obtain the object detection result 10B, the instance segmentation result 10S and the pose estimation result 10P of the aforementioned any object among the multiple objects mentioned above, such as the multiple object detection results 11B, 12B, 13B, etc., the multiple instance segmentation results 11S, 12S, 13S, etc. and the multiple pose estimation results 11P, 12P, 13P, etc. of the multiple objects, respectively, and perform image processing to optionally highlight the multiple objects with the multiple object detection results 11B, 12B, 13B, etc., the multiple instance segmentation results 11S, 12S, 13S, etc. and the multiple pose estimation results 11P, 12P, 13P, etc. on an output image (e.g., output image data thereof) corresponding to the input image (e.g., the input image data thereof), for indicating the locations, the pixels, and the skeletons of the multiple objects in real time, respectively, to achieve excellent overall performance. In addition, the time and the power consumption of converting the input image (e.g., the input image data thereof) into the multiple object detection results 11B, 12B, 13B, etc., the multiple instance segmentation results 11S, 12S, 13S, etc. and the multiple pose estimation results 11P, 12P, 13P, etc. by the predetermined model such as the Human Trinity model 10 is independent of the object count of the multiple objects. For example, when the number of instances (e.g., persons) increases and reaches twenty or more, and even reaches one hundred or more, the end-to-end inference time of the Human Trinity model 10 will not significantly increase, and more particularly, can remain almost unchanged. In comparison with the related art, the video processing method provided by the present invention can realize the electronic device with reliable detection control without introducing any side effect or in a way that is less likely to introduce side effects.

Figure 3:
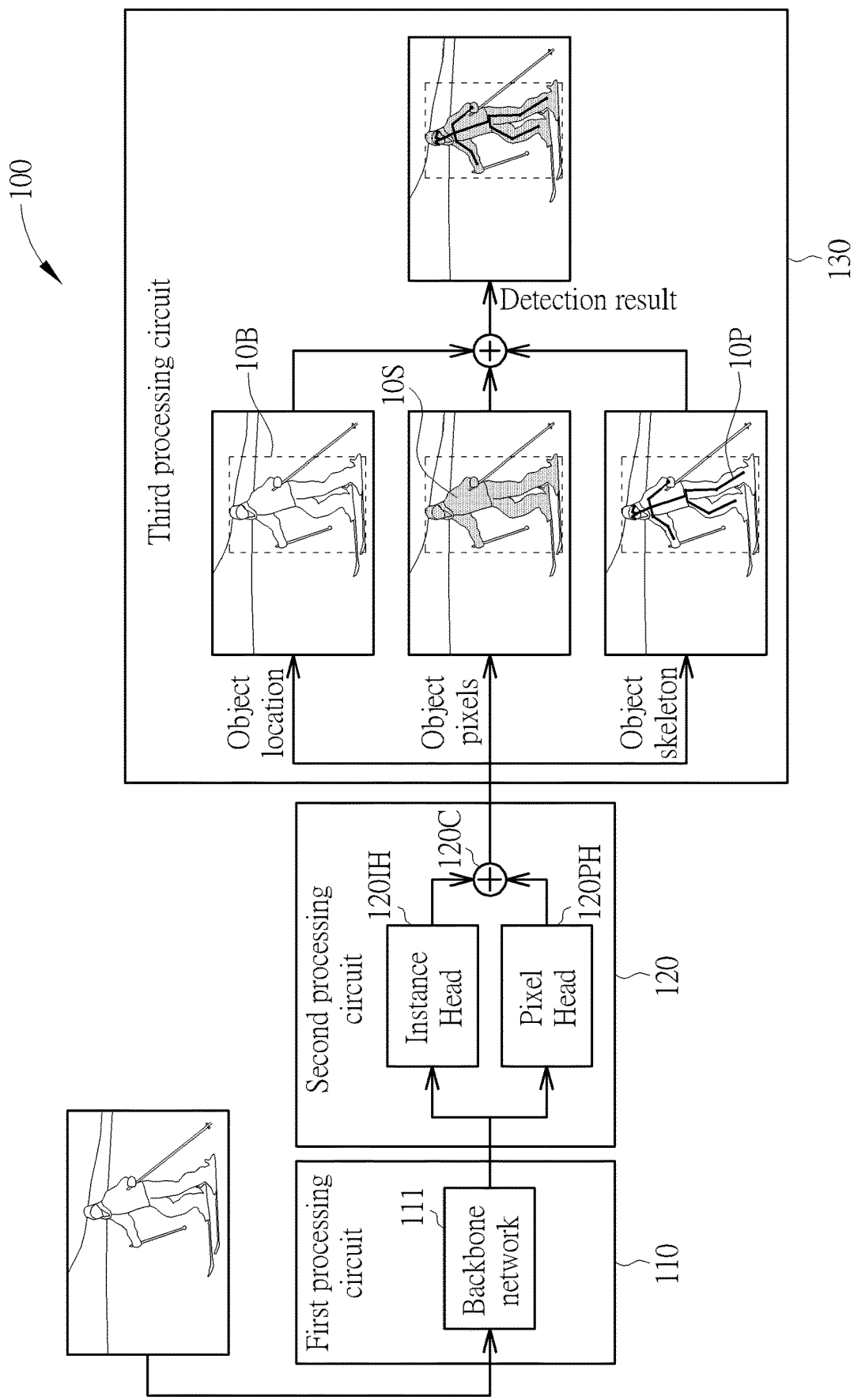
FIG. 3 is a diagram illustrating a video processing circuit for detecting a location, pixels, and a skeleton of an object according to an embodiment of the present invention, where the video processing method can be applied to the video processing circuit.

FIG. 3 is a diagram illustrating a video processing circuit 100 for detecting a location, pixels, and a skeleton of an object according to an embodiment of the present invention, where the video processing method can be applied to the video processing circuit 100. The electronic device that operates according to the video processing method may comprise the video processing circuit 100, and the video processing circuit 100 may comprise a first processing circuit 110, a second processing circuit 120 coupled to the first processing circuit 110, and a third processing circuit 130 coupled to the second processing circuit 120. For better comprehension, the video processing circuit 100 may be configured to run program codes corresponding to the predetermined model (e.g., the Human Trinity model 10) of the single deep learning network to implement the predetermined model within the video processing circuit 100, and more particularly, the first processing circuit 110 may comprise at least one network (e.g., one or more networks) such as a backbone network 111, and the second processing circuit 120 may comprise at least one instance head (e.g., one or more instance heads), which can be collectively referred to as the instance head 120IH, as well as a pixel head 120PH, and may further comprise a combining network 120C, but the present invention is not limited thereto.

In addition, the video processing circuit 100 running the program codes corresponding to the predetermined model (e.g., the Human Trinity model 10) can simultaneously perform the three types of processing such as the object detection (e.g., the human detection), the instance segmentation and the pose estimation in the one-stage processing to simultaneously generate the object detection result 10B, the instance segmentation result 10S and the pose estimation result 10P of the object as shown in FIG. 3. As a result, the third processing circuit 130 can perform image processing on the input image (e.g., the input image data thereof) to optionally highlight the object with the object detection result 10B, the instance segmentation result 10S and the pose estimation result 10P on the output image (e.g., the output image data thereof) corresponding to the input image (e.g., the input image data thereof), respectively, and more particularly, mark the associated detection results such as the object detection result 10B, the instance segmentation result 10S and the pose estimation result 10P on the output image (e.g., the output image data thereof), to indicate the location, the pixels, and the skeleton of the object, respectively. For example, the object may represent the single object mentioned above, but the present invention is not limited thereto. For another example, the object may represent the aforementioned any object among the aforementioned multiple objects, such as any human object among the human objects shown in FIG. 1, where the object detection result 10B, the instance segmentation result 10S and the pose estimation result 10P as shown in FIG. 3 may represent the object detection result of the aforementioned any object among the multiple object detection results of the multiple objects, the instance segmentation result of the aforementioned any object among the multiple instance segmentation results of the multiple objects, and the pose estimation result of the aforementioned any object among the multiple pose estimation results of the multiple objects, respectively, such as the multiple object detection results 11B, 12B, 13B, etc. (e.g., the object locations), the multiple instance segmentation results 11S, 12S, 13S, etc. (e.g., the object pixels) and the multiple pose estimation results 11P, 12P, 13P, etc. (e.g., the object skeletons) of the multiple objects as shown in FIG. 1, respectively. As a result, the third processing circuit 130 can perform image processing on the input image (e.g., the input image data thereof) to optionally highlight the multiple objects with the multiple object detection results 11B, 12B, 13B, etc., the multiple instance segmentation results 11S, 12S, 13S, etc. and the multiple pose estimation results 11P, 12P, 13P, etc. on the output image (e.g., the output image data thereof) corresponding to the input image (e.g., the input image data thereof), respectively, and more particularly, mark the associated detection results such as the multiple object detection results 11B, 12B, 13B, etc., the multiple instance segmentation results 11S, 12S, 13S, etc. and the multiple pose estimation results 11P, 12P, 13P, etc. on the output image (e.g., the output image data thereof), to indicate the locations, the pixels, and the skeletons of the multiple objects, respectively.

Figure 4:
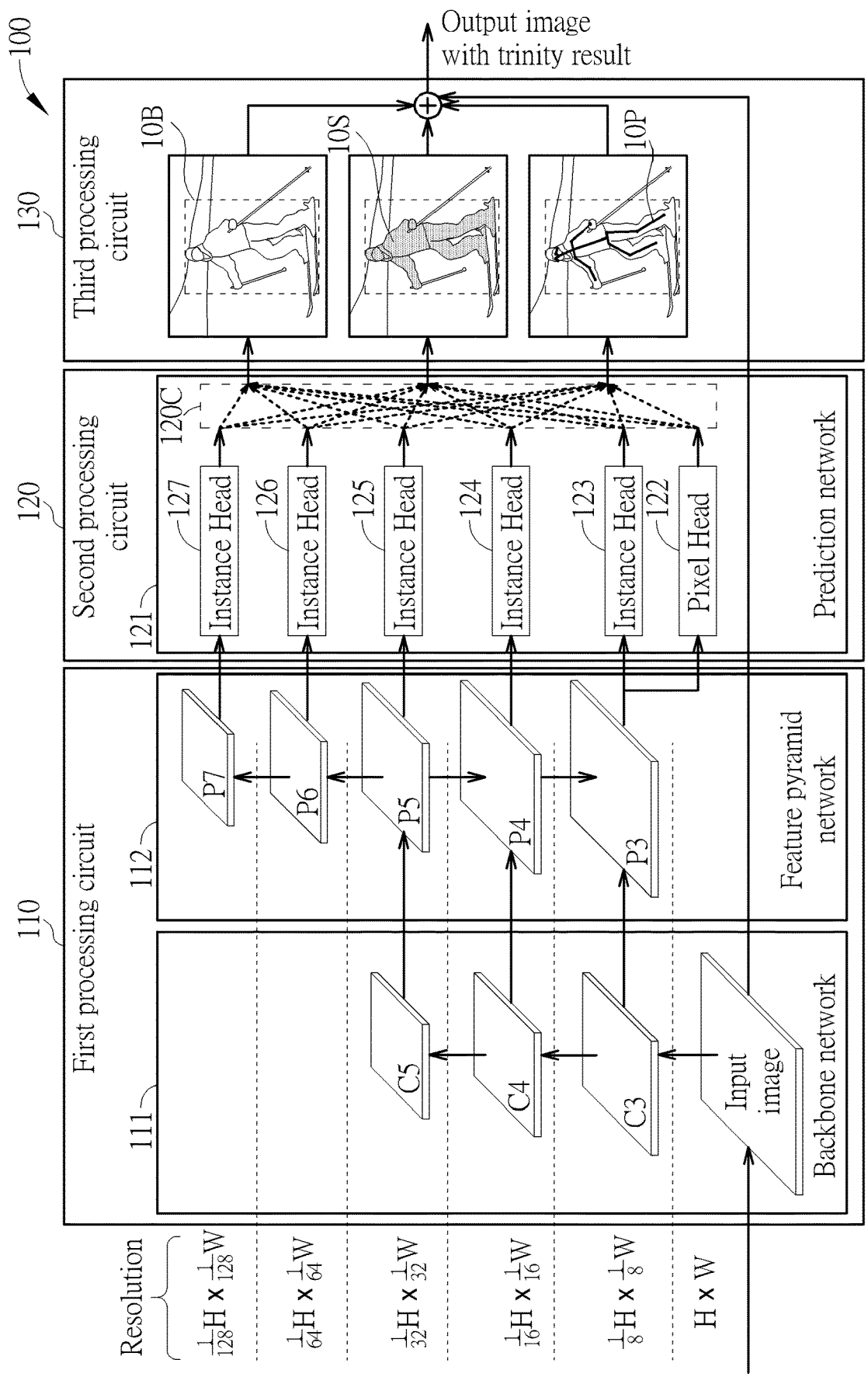
FIG. 4 is a diagram illustrating a network architecture involved with the one-stage model control scheme of the video processing method according to an embodiment of the present invention.

FIG. 4 is a diagram illustrating a network architecture involved with the one-stage model control scheme of the video processing method according to an embodiment of the present invention, where the network architecture shown in FIG. 4 can be taken as an example of the network architecture of the Human Trinity model 10 in the one-stage model control scheme shown in FIG. 2. In addition to the backbone network 111, the aforementioned at least one network within the first processing circuit 110 may further comprise a feature pyramid network 112, and a prediction network 121 within the second processing circuit 120 may comprise the aforementioned pixel head 120PH such as the pixel head 122, and comprise the aforementioned at least one instance head, collectively referred to as the instance head 120IH, such as the instance heads 123-127, as well as the combining network 120C. In the embodiment shown in FIG. 4, the aforementioned at least one instance head such as the instance head 120IH can be illustrated as multiple instance heads such as the instance heads 123-127, but the present invention is not limited thereto. According to some embodiments, the instance heads 123-127 can be integrated into the same instance head.

For example, regarding the input image (e.g., the input image data) with the resolution of H×W (e.g., H pixels by W pixels, where the symbols "H" and "W" may represent positive integers), the network architecture may comprise multiple partial network architectures as follows:

(1) a backbone network architecture of the backbone network 111, arranged to convert the input image (e.g., the input image data) into a set of first feature maps such as the feature maps C3, C4 and C5, where the feature maps C3, C4 and C5 may correspond to a set of first resolutions such as the resolution of ($\frac{1}{8}$)H×($\frac{1}{8}$)W, the resolution of ($\frac{1}{16}$)H×($\frac{1}{16}$)W and the resolution of ($\frac{1}{32}$)H×($\frac{1}{32}$)W, respectively, for example, the backbone network architecture of the backbone network 111 may extract the feature map C3 from the input image (e.g., the input image data) through convolution operations, and extract the feature map C4 from the feature map C3 through convolution operations, and further extract the feature map C5 from the feature map C4 through convolution operations;

(2) a feature pyramid network architecture of the feature pyramid network 112, coupled to the backbone network architecture of the backbone network 111, arranged to extract a set of second feature maps such as the feature maps P3, P4, P5, P6 and P7 from the set of first feature maps such as the feature maps C3, C4 and C5, where the feature maps P3, P4, P5, P6 and P7 may correspond to a set of second resolutions such as the resolution of ($\frac{1}{8}$)H×($\frac{1}{8}$)W, the resolution of ($\frac{1}{16}$)H×($\frac{1}{16}$)W, the resolution of ($\frac{1}{32}$)H×($\frac{1}{32}$)W, the resolution of ($\frac{1}{64}$)H×($\frac{1}{64}$)W and the resolution of ($\frac{1}{128}$)H×($\frac{1}{128}$)W, respectively, for example, the feature pyramid network architecture of the feature pyramid network 112 may extract the feature map P5 from the feature map C5 through convolution operations, extract the feature map P6 from the feature map P5 through convolution operations, and extract the feature map P7 from the feature map P6 through convolution operations, and may extract the feature map P4 from the feature maps C4 and P5 through convolution operations, and extract the feature map P3 from the feature maps C3 and P4 through convolution operations;

(3) a pixel head network architecture of the pixel head 122, coupled to the feature pyramid network architecture of the feature pyramid network 112, arranged to convert a first portion of feature maps among the set of second feature maps, such as the feature map P3, into a set of first processing results, where the set of first processing results may correspond to the resolution of ($\frac{1}{8}$)H×($\frac{1}{8}$)W, that is, the same resolution as that of the instance head 123 as will be further described as follows;

(4) multiple instance head network architectures of the instance heads 123-127, coupled to the feature pyramid network architecture of the feature pyramid network 112, arranged to convert the set of second feature maps such as the feature maps P3, P4, P5, P6 and P7 into multiple sets of second processing results, respectively, where the multiple sets of second processing results obtained from the multiple instance head network architectures of the instance heads 123-127 may correspond to the set of second resolutions such as the resolution of ($\frac{1}{8}$)H×($\frac{1}{8}$)W, the resolution of ($\frac{1}{16}$)H×($\frac{1}{16}$)W, the resolution of ($\frac{1}{32}$)H×($\frac{1}{32}$)W, the resolution of ($\frac{1}{64}$)H×($\frac{1}{64}$)W and the resolution of ($\frac{1}{128}$)H×($\frac{1}{128}$)W, respectively; and (5) a combining network architecture of the combining network 120C, coupled to the pixel head network architecture of the pixel head 122 and the respective instance head network architectures of the instance heads 123-127, arranged to perform combining operations, for example, perform post-processing on the respective processing results (e.g., the set of first processing results and the multiple sets of second processing results) of the pixel head 122 and the instance heads 123-127 to generate the object detection result 10B, the instance segmentation result 10S and the pose estimation result 10P of the aforementioned any object among the multiple objects as shown in any of FIG. 2, FIG. 3 and FIG. 4, such as the multiple object detection results 11B, 12B, 13B, etc. (e.g., the object locations), the multiple instance segmentation results 11S, 12S, 13S, etc. (e.g., the object pixels) and the multiple pose estimation results 11P, 12P, 13P, etc. (e.g., the object skeletons) of the multiple objects, respectively, through Non-Maximum Suppression (NMS);

where the associated parameters of the multiple partial network architectures can be obtained from a training procedure of the network architecture of the Human Trinity model 10, but the present invention is not limited thereto. According to some embodiments, the network architecture of the Human Trinity model 10 may vary. For example, the multiple partial network architectures in the network architecture, the associated resolutions, and/or the number of layers regarding the resolutions may vary. In addition, the third processing circuit 130 can perform image processing on the input image (e.g., the input image data) to optionally highlight the multiple objects with the multiple object detection results 11B, 12B, 13B, etc., the multiple instance segmentation results 11S, 12S, 13S, etc. and the multiple pose estimation results 11P, 12P, 13P, etc. on the output image (e.g., the output image data) corresponding to the input image (e.g., the input image data), respectively, and more particularly, combine the associated detection results such as the respective trinity results (e.g., the multiple object detection results 11B, 12B, 13B, etc., the multiple instance segmentation results 11S, 12S, 13S, etc. and the multiple pose estimation results 11P, 12P, 13P, etc.) of the multiple objects with the input image (e.g., the input image data) to generate the output image (e.g., the output image data) with the trinity results.

Based on at least one control scheme (e.g., one or more control schemes) of the video processing method, such as the one-stage model control scheme, the first processing circuit 110 can be configured to act as the aforementioned at least one network such as the backbone network 111 in the predetermined model of the single deep learning network to receive the input image (e.g., the input image data) having the multiple objects (e.g., the human objects) and to convert the input image (e.g., the input image data) into at least one feature map (e.g., one or more feature maps) such as the set of first feature maps (e.g., the feature maps C3, C4 and C5) and the set of second feature maps (e.g., the feature maps P3, P4, P5, P6 and P7) through the backbone network architecture of the backbone network 111 and the feature pyramid network architecture of the feature pyramid network 112 within the network architecture. Please note that an object being detected (e.g., the shape and the size thereof) as shown in any of FIG. 2, FIG. 3 and FIG. 4 is for illustrative purposes only, and is not meant to be a limitation of the present invention. In addition, the second processing circuit 120 can be configured to act as the pixel head 120PH such as the pixel head 122 and the instance head 120IH such as the instance heads 123-127 in the predetermined model of the single deep learning network to receive the aforementioned at least one feature map and perform conversion on the aforementioned at least one feature map through the pixel head network architecture of the pixel head 122 and the multiple instance head network architectures of the instance heads 123-127 within the network architecture to simultaneously obtain the object detection result 10B, the instance segmentation result 10S and the pose estimation result 10P of the aforementioned any object among the multiple objects, and more particularly, convert the aforementioned at least one feature map into the multiple object detection results 11B, 12B, 13B, etc. (e.g., the object locations), the multiple instance segmentation results 11S, 12S, 13S, etc. (e.g., the object pixels) and the multiple pose estimation results 11P, 12P, 13P, etc. (e.g., the object skeletons) of the multiple objects, respectively, for indicating the locations, the pixels, and the skeletons of the multiple objects, respectively.

For better comprehension, for the aforementioned any object among the multiple objects, the object detection result 10B, the instance segmentation result 10S and the pose estimation result 10P thereof can share the same instance, and the electronic device (e.g., the video processing circuit 100) that operates according to the video processing method can obtain the object detection result 10B, the instance segmentation result 10S and the pose estimation result 10P at the same time, having no need to perform any unnecessary association operation between the respective processing results of the three types of processing (e.g., the object detection, the instance segmentation and the pose estimation) in the one-stage processing, and therefore, can output the output image (e.g., the output image data) with the trinity results in real time.

In addition, in the predetermined model (e.g., the Human Trinity model 10) of the single deep learning network, a first task of obtaining the multiple object detection results 11B, 12B, 13B, etc., a second task of obtaining the multiple instance segmentation results 11S, 12S, 13S, etc., and a third task of obtaining the multiple pose estimation results 11P, 12P, 13P, etc. can be independent of each other, and therefore, one task among the first task, the second task and the third task will not hinder another task among the first task, the second task and the third task. For the electronic device (e.g., the video processing circuit 100 therein), the time and the power consumption of converting the input image (e.g., the input image data) into the multiple object detection results 11B, 12B, 13B, etc., the multiple instance segmentation results 11S, 12S, 13S, etc. and the multiple pose estimation results 11P, 12P, 13P, etc. by the predetermined model (e.g., the Human Trinity model 10) of the single deep learning network can be independent of the object count of the multiple objects. As a result, even in a difficult situation such as that for the related art (e.g., the number of instances such as persons increases and reaches one hundred or more), the end-to-end inference time of the Human Trinity model 10 will not significantly increase, and more particularly, can remain almost unchanged.

Additionally, in the predetermined model (e.g., the Human Trinity model 10) of the single deep learning network, no task of cropping a portion of the input image (e.g., the input image data) is required, and no task of cropping a portion of any feature map among the aforementioned at least one feature map is required. In comparison with the related art, the video processing method and the associated video processing circuit 100 provided by the present invention can realize the electronic device with reliable detection control without introducing any side effect or in a way that is less likely to introduce side effects.

According to some embodiments, the input image can be a red-green-blue (RGB) image, and the input image data can be the image data of the input image, such as the image data of the RGB image, but the present invention is not limited thereto. For example, the input image (e.g., the input image data) can be implemented by way of any of other types of images. For brevity, similar descriptions for these embodiments are not repeated in detail here.

Some implementation details regarding the Human Trinity model 10 can be further described as follows. According to some embodiments, the Human Trinity model 10 can be implemented by way of a ResNet-based feature pyramid network (FPN) to handle human instances with various scales. More particularly, two types of prediction heads, for example, the pixel head 120PH such as the pixel head 122 and the instance head 120IH such as the instance heads 123-127, can be constructed for downstream tasks. In a nutshell, the instance head 120IH can be configured to perform the object detection (e.g., the human detection) and the pose estimation in a coarse level, and the pixel head 120PH can be configured to perform the instance segmentation and the pose estimation in a fine-grained level.

The network architecture shown in FIG. 4 can provide the video processing circuit 100 with a compact and effective sample assignment mechanism such as the trinity sampling mechanism, to allow the video processing circuit 100 to deal with sample assignment in the multi-task learning of the human detection, the instance segmentation and the pose estimation. With aid of the trinity sampling mechanism, the video processing circuit 100 can select better positive proposals for training the Human Trinity model 10 on these three tasks at the same time. In addition, the video processing circuit 100 can predict trinity scores to improve the NMS result at the inference stage by ranking proposals with higher quality for these tasks, aligning with the sampling behavior in the training stage.

Given the input image (e.g., the input image data), the video processing circuit 100 can utilize the backbone network 111 together with the feature pyramid network 112 to extract multi-scale features such as FPN feature maps, for example, by converting the input image (e.g., the input image data) into the set of first feature maps (e.g., the feature maps C3, C4 and C5) and extracting the set of second feature maps (e.g., the feature maps P3, P4, P5, P6 and P7) from the set of first feature maps to be the multi-scale features such as the FPN feature maps, and utilize the two types of prediction heads, for example, the pixel head 120PH such as the pixel head 122 and the instance head 120IH such as the instance heads 123-127, to process the multi-scale features into the outputs of downstream tasks. The instance head 120IH such as the instance heads 123-127 can operate on the multi-scale features (e.g., the feature maps P3, P4, P5, P6 and P7) as shown in FIG. 4 and predict person-class probability and boxes for the detection such as the object detection (e.g., the human detection), proposal embedding and margins for the instance segmentation, initial keypoints (or key points) for the pose estimation, and trinity scores for ranking proposals in the NMS result. The pixel head 120PH such as the pixel head 122 can operate on the multi-scale features (e.g., the feature map P3) with the largest resolution (e.g., the resolution of the feature map P3, such as (⅛)H× (⅛)W) among the set of second resolutions and predict pixel embedding for producing the instance mask for each person proposal, an offset map (or offset map) for refining initial coarse keypoints, and an auxiliary heatmap (or heat map) used only during training for capturing better keypoint semantics.

Figure 5:
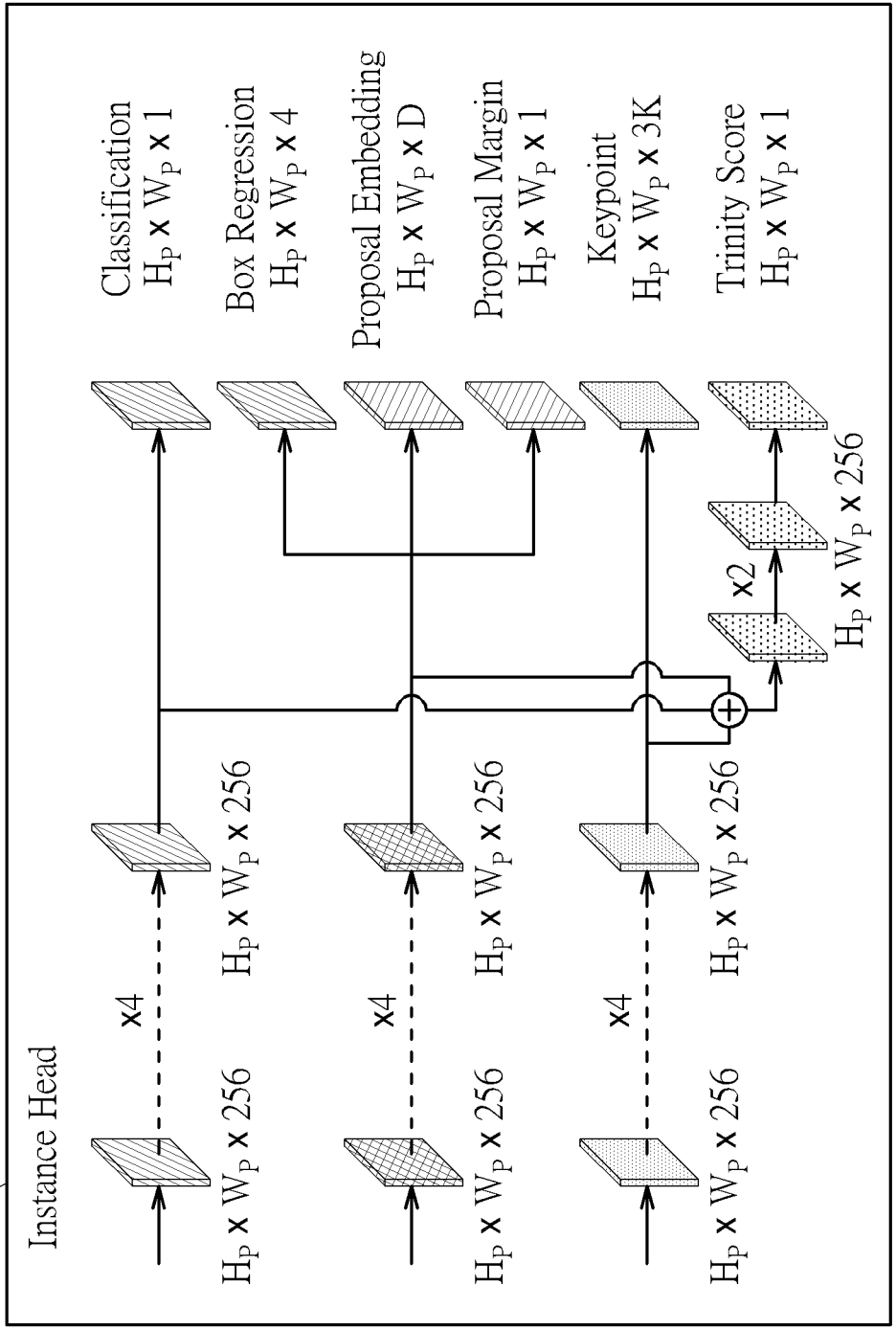
FIG. 5 is a diagram illustrating an instance head in the network architecture shown in FIG. 4 according to an embodiment of the present invention.

FIG. 5 is a diagram illustrating an instance head 220 in the network architecture shown in FIG. 4 according to an embodiment of the present invention, where the instance head 220 shown in FIG. 5 can be taken as an example of any instance head (e.g., each instance head) among the instance heads 123-127 shown in FIG. 4. The symbol "D" may represent the dimension of embedding, and the symbol "K" may represent the number of keypoints of an object (e.g., a person). The three processing paths shown in the left half of FIG. 5 can operate on one of the multi-scale features, such as any feature map P among the feature maps P3-P7 with the corresponding resolution of $H_P \times W_P$ (e.g., the resolution of the feature map P among the set of second resolutions) and with 256 channels (labeled "$H_P \times W_P \times 256$" for brevity), to predict the person-class probability (labeled "Classification" for brevity), the boxes (labeled "Box Regression" for better comprehension), the proposal embedding, the proposal margins, the initial keypoints (labeled "Keypoint" for brevity), and the trinity scores. For better comprehension, the input image can be an RGB image having three channels such as the red (R) channel, the green (G) channel and the blue (B) channel, while the feature map P can be a feature map having 256 channels, but the present invention is not limited thereto. For example, the symbol "×4" labeled on some processing paths shown in FIG. 5 may indicate that there are four layers of convolution operations on each processing path among these processing paths. For another example, the symbol "×2" labeled on another processing path shown in FIG. 5 may indicate that there are two layers of convolution operations on this processing path. The legends of the object detection (e.g., the human detection), the instance segmentation and the pose estimation as shown in FIG. 5 indicate that:

(1) the person-class probability and the boxes, as well as the associated processing paths such as the first two processing paths (e.g., the two upper paths) among the three processing paths shown in the left half of FIG. 5, may correspond to the object detection (e.g., the human detection);

(2) the proposal embedding and the proposal margins, as well as the associated processing path such as the second processing path (e.g., the lower path of the two upper paths) among the three processing paths shown in the left half of FIG. 5, may correspond to the instance segmentation; and (3) the initial keypoints, as well as the associated processing path such as the third processing path (e.g., the lower path) among the three processing paths shown in the left half of FIG. 5, may correspond to the pose estimation;

where the second processing path among the three processing paths shown in the left half of FIG. 5 can be illustrated with the mixed shading pattern of the respective shading patterns of the legends of the object detection and the instance segmentation to indicate that this processing path can be configured to perform any of the object detection and the instance segmentation, but the present invention is not limited thereto. In addition, the trinity scores can be generated according to the respective processing results of the three processing paths shown in the left half of FIG. 5.

As mentioned above, the Human Trinity model 10 can be implemented by way of the FPN. Specifically, the video processing circuit 100 (e.g., some sub-circuits thereof, such as that on the associated processing paths shown in FIG. 5) can use at least one deep learning or neural network module to process the input image (e.g., the input image data thereof), such as any input image or image frame among multiple input images or image frames in the video stream, and more particularly, perform the object detection (e.g., the human detection), the instance segmentation and the pose estimation by using multiple different convolution filters on the associated processing paths shown in FIG. 5 to perform convolution operations on the feature map P. In addition, for the multiple objects that are detected, a set of characteristic values of the aforementioned any object (or the region where this object is located) among the multiple objects can be determined as the outputs of the instance head 220 by a certain deep learning or neural network module among the aforementioned at least one deep learning or neural network module, where any characteristic value among the set of characteristic values can be represented as a multi-dimensional vector. For example, the outputs of the instance head 220, such as the person-class probability (labeled "Classification" for brevity), the boxes (labeled "Box Regression" for better comprehension), the proposal embedding, the proposal margins, the initial keypoints (labeled "Keypoint" for brevity) and the trinity scores, can be represented as three-dimensional vectors having the sizes of ($H_P \times W_P \times 1$), ($H_P \times W_P \times 4$), ($H_P \times W_P D$), ($H_P \times W_P \times 1$), ($H_P \times W_P \times 3K$) and ($H_P \times W_P \times 1$), respectively. It is noted that the above-mentioned circuit design related to any processing path among the associated processing paths shown in FIG. 5 is well known to a person skilled in the art, and one of the main features of this embodiment is the applications of the object detection (e.g., the human detection), the instance segmentation and the pose estimation being simultaneously performed by the instance head 220 and the set of characteristic values thereof, so other details of the instance head 220 are not described here.

Figure 6:
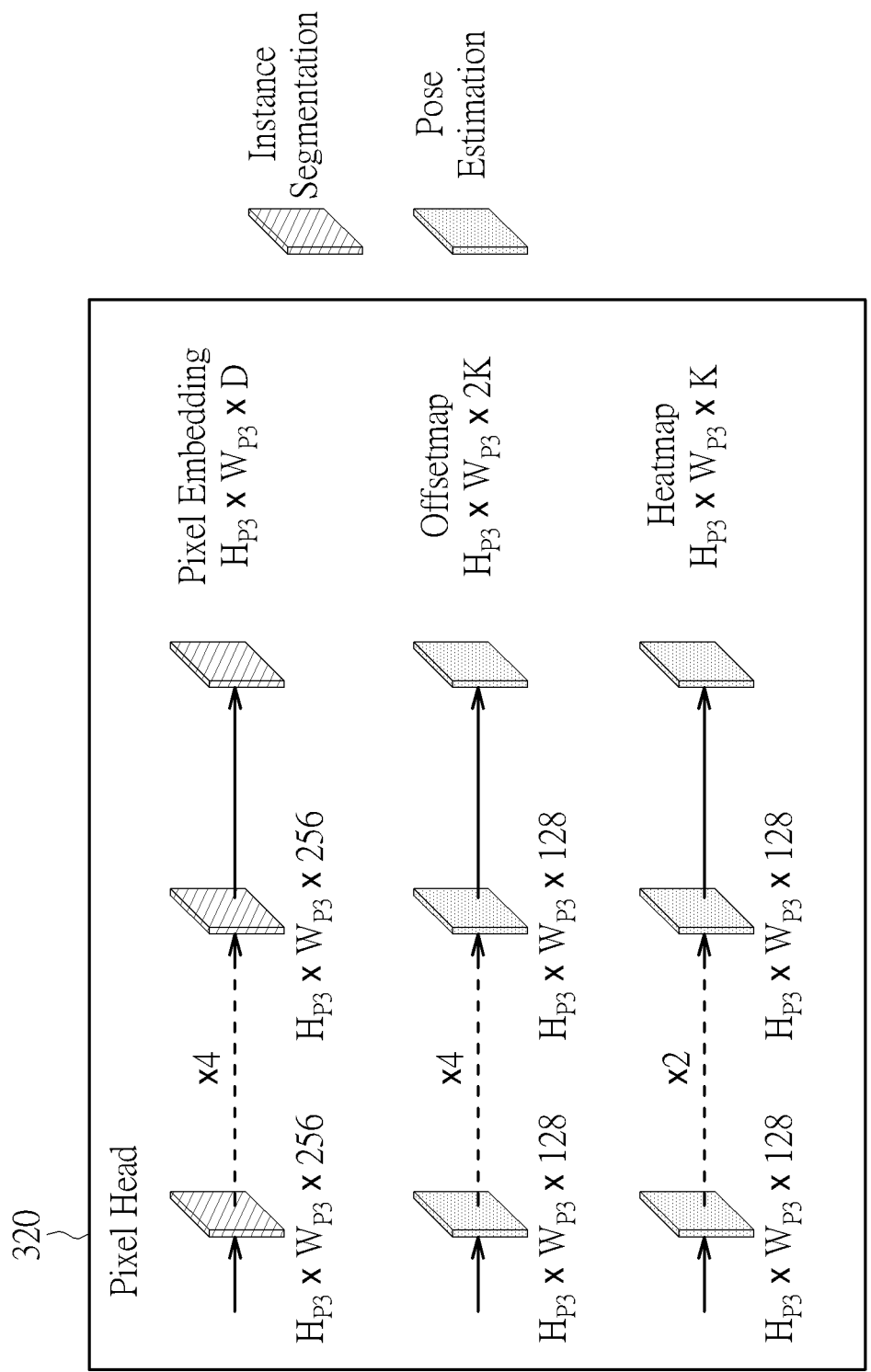
FIG. 6 is a diagram illustrating a pixel head in the network architecture shown in FIG. 4 according to an embodiment of the present invention.

FIG. 6 is a diagram illustrating a pixel head 320 in the network architecture shown in FIG. 4 according to an embodiment of the present invention, where the pixel head 320 shown in FIG. 6 can be taken as an example of the pixel head 122 shown in FIG. 4. The first processing path and the two other processing paths among the three processing paths shown in the left half of FIG. 6 can operate on one of the multi-scale features, such as the feature map P3 with the resolution of $H_{P3} \times W_{P3}$ thereof and with 256 channels and 128 channels, respectively (labeled "$H_{P3} \times W_{P3} \times 256$" and "$H_{P3} \times W_{P3} \times 128$" for brevity, respectively), to predict the pixel embedding, the offset map and the auxiliary heatmap (labeled "Heatmap" for brevity). For better comprehension, the input image can be an RGB image having three channels such as the R channel, the G channel and the B channel, while the feature map P3 input into the first processing path and the feature map P3 input into the two other processing paths can be a feature map having 256 channels and a feature map having 128 channels, respectively, but the present invention is not limited thereto. For example, the symbol "×4" labeled on some processing paths shown in FIG. 6 may indicate that there are four layers of convolution operations on each processing path among these processing paths. For another example, the symbol "×2" labeled on another processing path shown in FIG. 6 may indicate that there are two layers of convolution operations on this processing path. The legends of the instance segmentation and the pose estimation as shown in FIG. 6 indicate that:

(1) the pixel embedding, as well as the associated processing path such as the first processing path (e.g., the upper path) among the three processing paths shown in the left half of FIG. 6, may correspond to the instance segmentation;

(2) the offset map, as well as the associated processing path such as the second path (e.g., the middle path) among the three processing paths shown in the left half of FIG. 6, may correspond to the pose estimation; and (3) the auxiliary heatmap, as well as the associated processing path such as the third path (e.g., the lower path) among the three processing paths shown in the left half of FIG. 6, may correspond to the pose estimation;

but the present invention is not limited thereto.

As mentioned above, the Human Trinity model 10 can be implemented by way of the FPN. Specifically, the video processing circuit 100 (e.g., some sub-circuits thereof, such as that on the associated processing paths shown in FIG. 6) can use the aforementioned at least one deep learning or neural network module to process the input image (e.g., the input image data thereof), such as any input image or image frame among the multiple input images or image frames in the video stream, and more particularly, perform the instance segmentation and the pose estimation by using multiple different convolution filters on the associated processing paths shown in FIG. 6 to perform convolution operations on the feature map P3. In addition, for the multiple objects that are detected, a set of characteristic values of the aforementioned any object (or the region where this object is located) among the multiple objects can be determined as the outputs of the pixel head 320 by a certain deep learning or neural network module among the aforementioned at least one deep learning or neural network module, where any characteristic value among the set of characteristic values can be represented as a multi-dimensional vector. For example, the outputs of the pixel head 320, such as the pixel embedding, the offset map and the auxiliary heatmap (labeled "Heatmap" for brevity), can be represented as three-dimensional vectors having the sizes of ($H_{P3} \times W_{P3} \times D$), ($H_{P3} \times W_{P3} \times 2K$) and ($H_{P3} \times W_{P3} \times K$), respectively. It is noted that the abovementioned circuit design related to any processing path among the associated processing paths shown in FIG. 6 is well known to a person skilled in the art, and one of the main features of this embodiment is the applications of the instance segmentation and the pose estimation being simultaneously performed by the pixel head 320 and the set of characteristic values thereof, so other details of the pixel head 320 are not described here.

According to some embodiments, the trinity sampling mechanism of the video processing circuit 100 may work differently from the loss weighting of individual tasks. For example, the trinity sampling mechanism may choose positive proposals that should work well for all tasks at the same time. A proposal that is good for one task but not good for others may be not adequate in multi-task problems. Loss weighting of individual tasks, however, can be used for determining the relative importance of each task or the cost when a prediction of one task gets wrong. For brevity, similar descriptions for these embodiments are not repeated in detail here.

According to some embodiments, regarding sample assignment in the training of the Human Trinity model 10, the video processing circuit 100 can use the box, mask, and pose predictions of the Human Trinity model 10 as adaptive anchors for their corresponding tasks. The video processing circuit 100 can refer to these adaptive anchors to determine whether a location is a suitable positive for all of the three tasks or not. If it is detected that one location plays a good positive for all of the three tasks, its box, mask, and pose predictions should generate higher box Intersection over Union (IoU), mask IoU, and pose Object Keypoint Similarity (OKS) with a ground-truth (GT) instance. For brevity, similar descriptions for these embodiments are not repeated in detail here.

Figure 7:
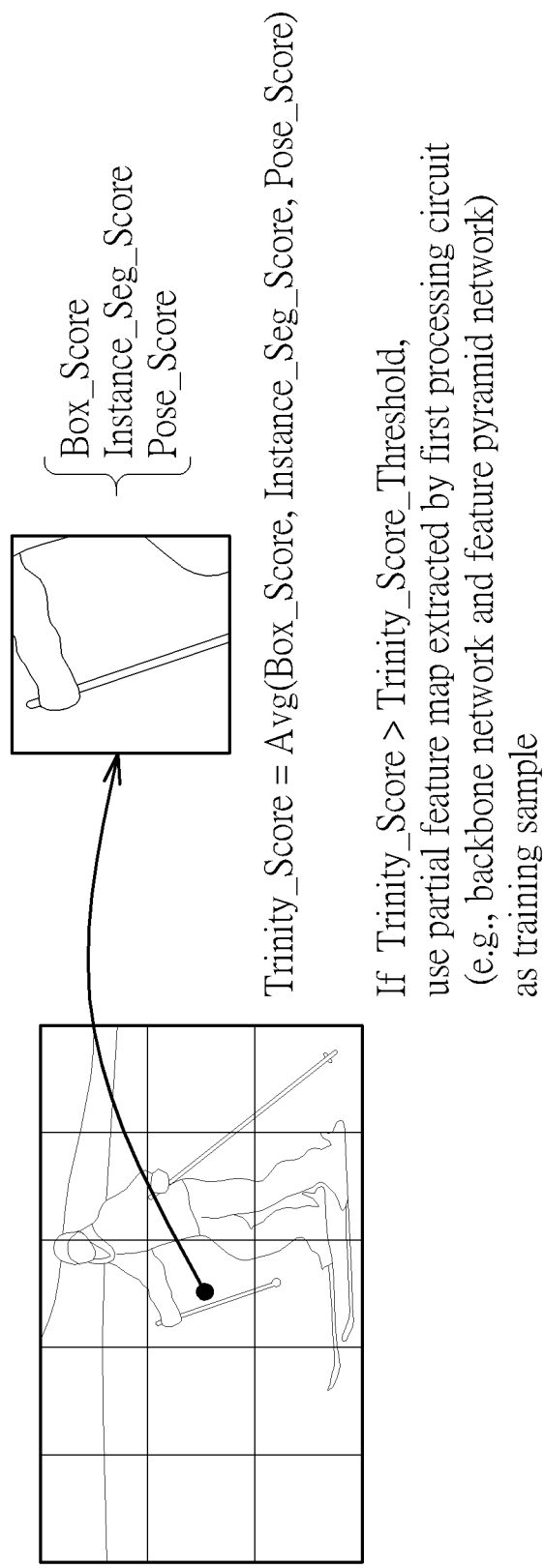
FIG. 7 is a diagram illustrating a trinity-score-based training control scheme of the video processing method according to an embodiment of the present invention.

FIG. 7 is a diagram illustrating a trinity-score-based training control scheme of the video processing method according to an embodiment of the present invention. The video processing circuit 100 can be configured to perform trinity-score-based training of the Human Trinity model 10, and more particularly, extract a target feature map from a target input image (e.g. an image that is similar to or the same as a partial image of a certain input image or image frame among the multiple input images or image frames in the video stream) and divide the target feature map into multiple partial feature maps of the target feature map, calculate a trinity score Trinity_Score of any partial feature map (e.g., each partial feature map) among the multiple partial feature maps, and determine whether to use the aforementioned any partial feature map in the training such as the trinity-score-based training of the Human Trinity model 10 according to the trinity score Trinity Score. For example, the video processing circuit 100 can calculate an average Avg(Box_Score, Instance_Seg_Score, Pose_Score) of a box score Box_Score, an instance segmentation score Instance_Seg_Score and a pose score Pose_Score of the aforementioned any partial feature map to be the trinity score Trinity_Score as follows:

Trinity Score=Avg(Box_Score,Instance_Seg_Score, Pose_Score);

where the box score Box_Score, the instance segmentation score Instance_Seg_Score and the pose score Pose_Score correspond to the object detection, the instance segmentation and the pose estimation, respectively, but the present invention is not limited thereto. In addition, the video processing circuit 100 can compare the trinity score Trinity_Score with a trinity score threshold Trinity_Score_Threshold to determine whether to use the aforementioned any partial feature map in the training of the Human Trinity model 10. For example, if the trinity score Trinity_Score reaches (e.g., is greater than) the trinity score threshold Trinity_Score_Threshold (labeled "Trinity_Score>Trinity_Score_Threshold" for brevity), the video processing circuit 100 can use the aforementioned any partial feature map as a training sample in the training of the Human Trinity model 10; otherwise, the video processing circuit 100 can prevent using the aforementioned any partial feature map as the training sample in the training of the Human Trinity model 10. It should be noted that it may not be necessary to implement the trinity score once the training of the Human Trinity model 10 is complete. However, it is possible to implement the trinity score in the inference stage as a basis of a final NMS-ranking for better performance. For brevity, similar descriptions for this embodiment are not repeated in detail here.

Figure 8:
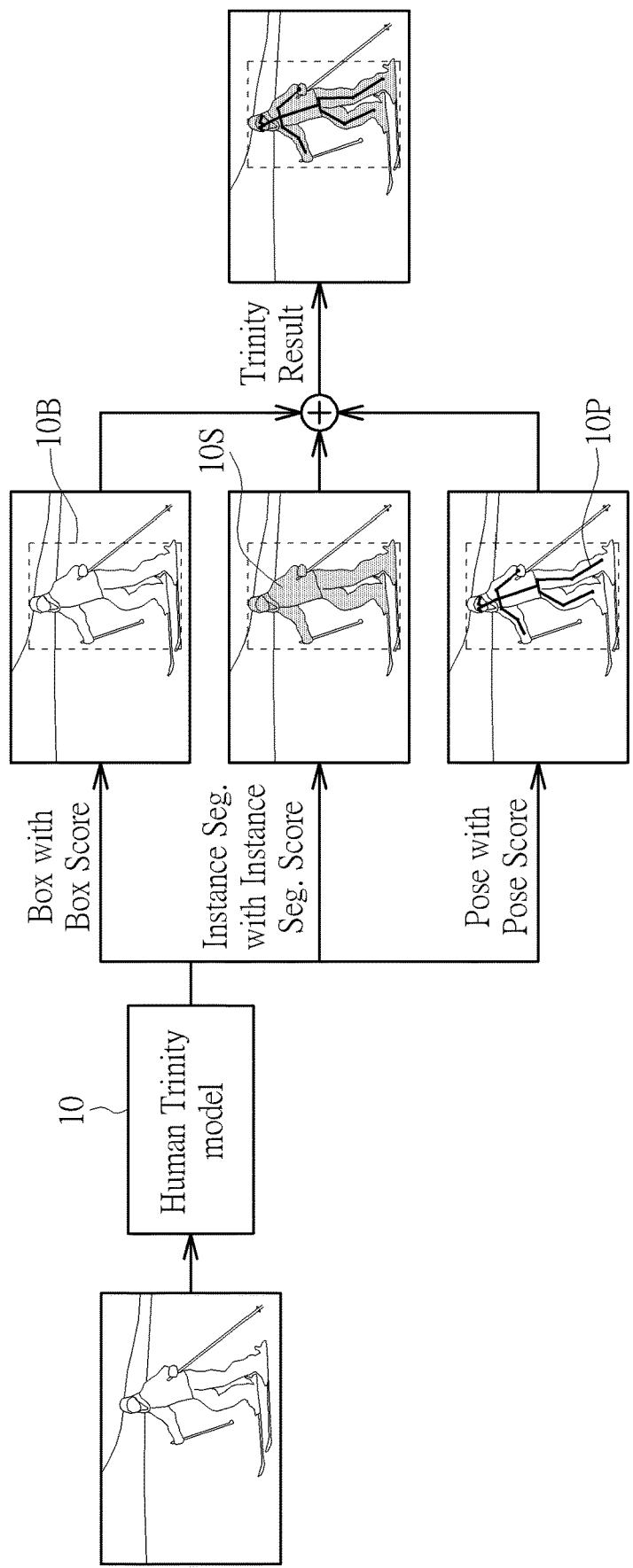
FIG. 8 is a diagram illustrating a trinity score control scheme of the video processing method according to an embodiment of the present invention.

FIG. 8 is a diagram illustrating a trinity score control scheme of the video processing method according to an embodiment of the present invention. During the training of the Human Trinity model 10, the video processing circuit 100 can obtain a target object detection result (e.g., the object detection result 10B), a target instance segmentation result (e.g., the instance segmentation result 10S) and a target pose estimation result (e.g., the pose estimation result 10P) of the aforementioned any partial feature map as well as the box score Box_Score, the instance segmentation score Instance_Seg_Score and the pose score Pose_Score of the aforementioned any partial feature map (respectively labeled "Box with Box Score", "Instance Seg. with Instance Seg. Score" and "Pose with Pose Score" for better comprehension), and more particularly, determine that the aforementioned any partial feature map can be used as the training sample in the training of the Human Trinity model 10 in a situation where the trinity score Trinity_Score is greater than the trinity score threshold Trinity_Score_Threshold. For brevity, similar descriptions for this embodiment are not repeated in detail here.

According to some embodiments, the multiple partial feature maps of the target feature map can be implemented by way of multiple pixels (e.g., features such as feature pixels) of the target feature map, where the aforementioned any partial feature map may represent any pixel (e.g., any feature such as any feature pixel) among the multiple pixels (e.g., the features such as the feature pixels) of the target feature map. For brevity, similar descriptions for these embodiments are not repeated in detail here.

Figure 9:
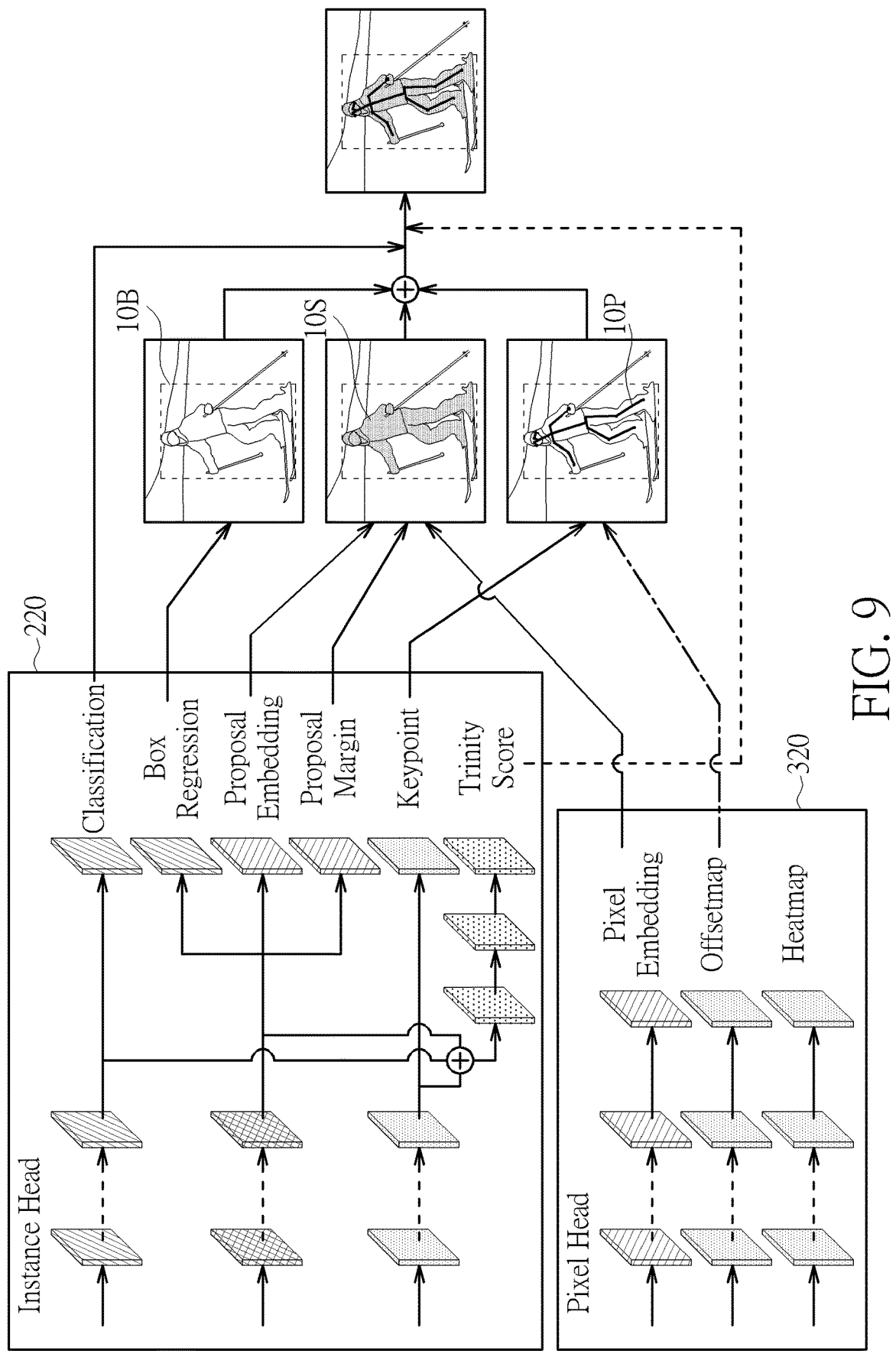
FIG. 9 is a diagram illustrating a network refinement control scheme of the video processing method according to an embodiment of the present invention.

FIG. 9 is a diagram illustrating a network refinement control scheme of the video processing method according to an embodiment of the present invention, where the network architecture shown in FIG. 4 can be configured to operate according to the respective outputs of the instance head 220 shown in FIG. 5 and the pixel head 320 shown in FIG. 6. In this embodiment, preferably, the processing paths depicted with dashed lines can be implemented to obtain much better processing results, in order to achieve excellent overall performance, but the present invention is not limited thereto. According to some embodiments, the processing paths depicted with dashed lines from the left half of FIG. 9 to the right half of FIG. 9 (e.g., starting from the instance head 220 or the pixel head 320) can be optional. For example, one or more processing paths among the processing paths depicted with dashed lines can be omitted.

In addition, the task of generating the heatmap is one of the tasks in the multi-task learning during the training phase. The video processing circuit 100 can be configured to match the ground truth of the heatmap with the corresponding loss function to supervise the Human Trinity model 10, to make the Human Trinity model 10 be more aware of the regions having the joints of the human objects. As a result, the video processing circuit 100 (e.g., the backbone network 111 together with the feature pyramid network 112) can learn to be capable of recognizing such joint regions having the human joints therein, and more particularly, generate the feature maps that contain information about these joint regions. For brevity, similar descriptions for this embodiment are not repeated in detail here.

According to some embodiments, the processing paths pointing toward the last processing path (e.g., as illustrated with the rightmost rightward arrow) for obtaining the trinity results can be configured to act as masks and/or filters for screening to guarantee the correctness of the trinity results. For brevity, similar descriptions for these embodiments are not repeated in detail here.

Some implementation details regarding the trinity score ranking in inference can be further described as follows. According to some embodiments, in order to align the sampling behavior during inference, the video processing circuit 100 can be configured to predict the trinity score Trinity_Score on the instance head 220 by adding the feature maps of classification, box, and keypoint towers (e.g., the towers of features on the feature maps of the person-class probability, the boxes and the keypoints, respectively), followed by some convolution units as shown in FIG. 9. For example, the video processing circuit 100 can multiply the trinity score Trinity_Score and classification score predictions for NMS ranking, such that the box, mask, and pose predictions with higher quality would be easier to stand out. For brevity, similar descriptions for these embodiments are not repeated in detail here.

Figure 10:
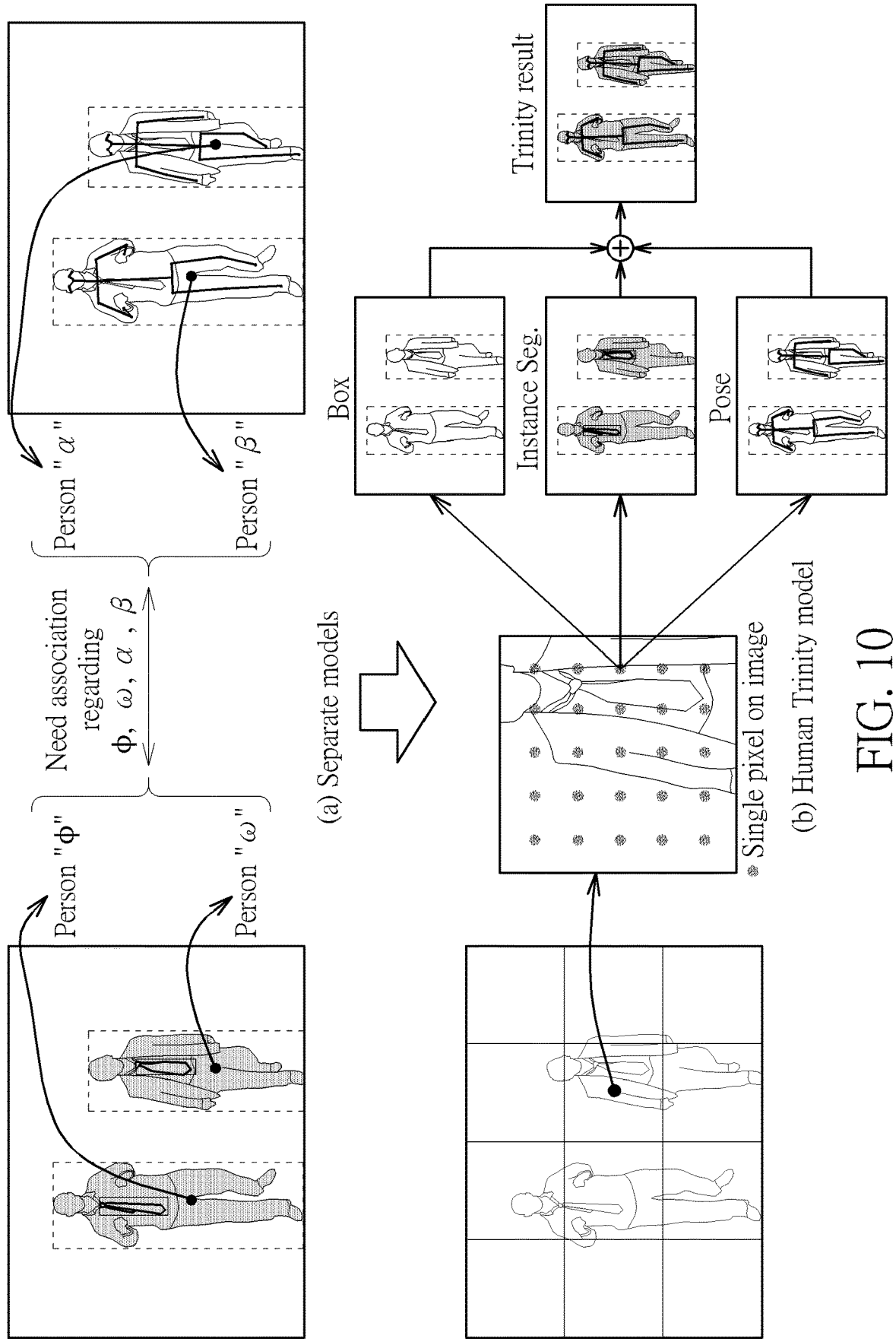
FIG. 10 illustrates, in the lower half thereof, a simultaneous detection control scheme of the video processing method regarding a Human Trinity model according to an embodiment of the present invention, where the upper half of FIG. 10 illustrates a separate detection control scheme regarding separate models for better comprehension.

FIG. 10 illustrates, in the lower half thereof, a simultaneous detection control scheme of the video processing method regarding the Human Trinity model 10 according to an embodiment of the present invention, where the upper half of FIG. 10 illustrates a separate detection control scheme regarding separate models such as model-A and model-B for better comprehension. According to the separate detection control scheme, since the separate models such as model-A and model-B are independent of each other, the box and mask results from the model-A may correspond to the persons "φ" and "ω" as shown in the upper left part of FIG. 10, and the pose results from model-B may correspond to the persons "α" and "β" as shown in the upper right part of FIG. 10. As a result, a device that operates according to the separate detection control scheme typically needs to further perform association operations in order to identify the persons "φ" and "β" as a same person such as the person on the left-hand side among the two persons on a first image and identify the persons "ω" and "α" as another same person such as the person on the right-hand side among the two persons on the first image (labeled "Need association regarding φ, ω, α, β" for brevity). For example, the association operations may be unsuccessful, and therefore, the box and mask results of one person among the two persons may be erroneously associated with the pose result of another person among the two persons.

According to the simultaneous detection control scheme, as any single pixel (e.g., each pixel) among the pixels in the image (e.g., the input image such as the input image data thereof) may be regarded as or may be arranged to act as a proposal in the predetermined model (e.g., the Human Trinity model 10) of the single deep learning network, and the proposal may correspond to a certain instance (e.g., a person on the image), it can be concluded that the box, mask, and pose output by this proposal do not need any association, and they all belong to the same instance (e.g., the same person). As a result, the video processing circuit 100 can simultaneously obtain the object detection results (e.g., the boxes), the instance segmentation results (e.g., the masks) and the pose estimation results (e.g., the poses) of the persons (respectively labeled "Box", "Instance Seg." and "Pose" for brevity), to generate the trinity results in real time. For brevity, similar descriptions for this embodiment are not repeated in detail here.

Figure 11:
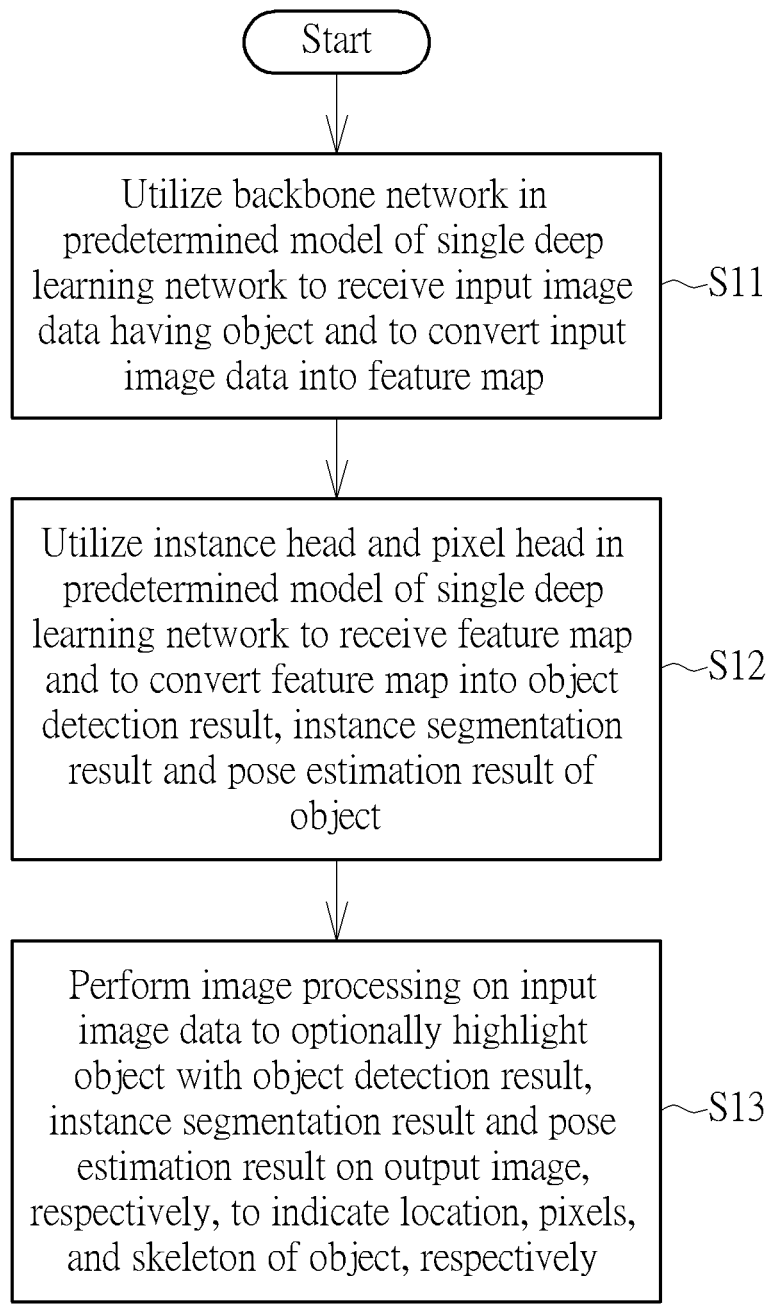
FIG. 11 is a working flow of the video processing method according to an embodiment of the present invention.

FIG. 11 is a working flow of the video processing method for detecting the location, the pixels, and the skeleton of the object according to an embodiment of the present invention. The video processing method can be applied to the video processing circuit 100, and more particularly, can be applied to the network architecture of the Human Trinity model 10.

In Step S11, the video processing circuit 100 (e.g., the first processing circuit 110) can utilize the backbone network 110, together with the feature pyramid network 112, in the predetermined model (e.g., the Human Trinity model 10) of the single deep learning network to receive the input image data (e.g., the image data of the input image) having the object (e.g., the single object or the multiple objects) and to convert the input image data (e.g., the image data of the input image) into the aforementioned at least one feature map (e.g., the feature maps P3-P7).

In Step S12, the video processing circuit 100 (e.g., the second processing circuit 120) can utilize the instance head 120IH (e.g., the instance heads 123-127) such as the instance head 220 and the pixel head 120PH (e.g., the pixel head 122) such as the pixel head 320 in the predetermined model of the single deep learning network to receive the aforementioned at least one feature map (e.g., the feature maps P3-P7) and to convert the aforementioned at least one feature map into the object detection result 10B, the instance segmentation result 10S and the pose estimation result 10P of the object, for indicating the location, the pixels, and the skeleton of the object, respectively. For example, the object may represent the single object mentioned above, but the present invention is not limited thereto. For another example, the object may represent the aforementioned any object among the aforementioned multiple objects, such as any human object among the human objects shown in FIG. 1, and the video processing circuit 100 (e.g., the second processing circuit 120) can utilize the instance head 120IH (e.g., the instance heads 123-127) such as the instance head 220 and the pixel head 120PH (e.g., the pixel head 122) such as the pixel head 320 in the predetermined model of the single deep learning network to receive the aforementioned at least one feature map (e.g., the feature maps P3-P7) and to convert the aforementioned at least one feature map into the multiple object detection results 11B, 12B, 13B, etc. (e.g., the object locations), the multiple instance segmentation results 11S, 12S, 13S, etc. (e.g., the object pixels) and the multiple pose estimation results 11P, 12P, 13P, etc. (e.g., the object skeletons) of the multiple objects, respectively, for indicating the locations, the pixels, and the skeletons of the multiple objects, respectively.

In Step S13, the video processing circuit 100 (e.g., the third processing circuit 130) can perform image processing on the input image data (e.g., the image data of the input image) to optionally highlight the object with the object detection result 10B, the instance segmentation result 10S and the pose estimation result 10P on the output image (e.g., the output image data thereof) corresponding to the input image data (e.g., the image data of the input image), respectively, to indicate the location, the pixels, and the skeleton of the object, respectively. For example, the object may represent the single object mentioned above, but the present invention is not limited thereto. For another example, the object may represent the aforementioned any object among the aforementioned multiple objects, such as any human object among the human objects shown in FIG. 1, and the video processing circuit 100 (e.g., the third processing circuit 130) can perform image processing on the input image data (e.g., the image data of the input image) to optionally highlight the multiple objects with the multiple object detection results 11B, 12B, 13B, etc., the multiple instance segmentation results 11S, 12S, 13S, etc. and the multiple pose estimation results 11P, 12P, 13P, etc. on the output image (e.g., the output image data thereof) corresponding to the input image data (e.g., the image data of the input image), respectively, to indicate the locations, the pixels, and the skeletons of the multiple objects, respectively.

Based on the aforementioned at least one control scheme of the video processing method, such as at least one portion of control schemes (e.g., a portion of control schemes or all control schemes) among the control schemes of the video processing method in the embodiments as described above, the video processing circuit 100 can generate the output image (e.g., the output image data thereof) with the trinity results in real time, to achieve excellent overall performance. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 11.

According to some embodiments, the input image data of the input image can be implemented by way of raw image data. For brevity, similar descriptions for these embodiments are not repeated in detail here.

In one or more of the embodiments described above, the multiple objects can be human objects, and the multiple object detection results 11B, 12B, 13B, etc. (e.g., the object locations) can be human detection results such as the locations of the persons that are detected, but the present invention is not limited thereto. According to some embodiments, the multiple objects can be any of other types of objects such as animals, etc., and the multiple object detection results 11B, 12B, 13B, etc. (e.g., the object locations) can be the corresponding detection results such as the locations of the objects that are detected. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method, for detecting a location, pixels, and a skeleton of an object, the video processing method comprising:
   utilizing a backbone network in a predetermined model of a single deep learning network to receive input image data having the object and to convert the input image data into at least one feature map;
   utilizing a pixel head in the predetermined model of the single deep learning network to receive the at least one feature map and convert the at least one feature map into first processing results, utilizing at least one instance head in the predetermined model of the single deep learning network to receive the at least one feature map and convert the at least one feature map into second processing results, and utilizing a combining circuit in the predetermined model of the single deep learning network to perform post-processing on the first processing results and second processing results to generate an object detection result, an instance segmentation result and a pose estimation result of the object, for indicating the location, the pixels, and the skeleton of the object, respectively; and performing trinity-score-based training of the predetermined model of the single deep learning network, comprising:
extracting a target feature map from a target input image and dividing the target feature map into multiple partial feature maps of the target feature map;
calculating a trinity score of any partial feature map among the multiple partial feature maps; and
according to the trinity score, determining whether to use the any partial feature map in the trinity-score-based training.

2. The video processing method of claim 1, further comprising:
performing image processing on the input image data to highlight the object with the object detection result, the instance segmentation result and the pose estimation result on an output image corresponding to the input image data, respectively, to indicate the location, the pixels, and the skeleton of the object, respectively.

3. The video processing method of claim 1, wherein the input image data is image data of an input image, and the input image is a red-green-blue (RGB) image.

4. The video processing method of claim 1, wherein the object is a human object, and the object detection result is a human detection result.

5. The video processing method of claim 1, wherein the object detection result of the object, the instance segmentation result of the object and the pose estimation result of the object share a same instance.

6. The video processing method of claim 5, wherein utilizing the pixel head in the predetermined model of the single deep learning network to receive the at least one feature map and convert the at least one feature map into first processing results, utilizing the at least one instance head in the predetermined model of the single deep learning network to receive the at least one feature map and convert the at least one feature map into second processing results, and utilizing the combining circuit in the predetermined model of the single deep learning network to perform post-processing on the first processing results and second processing results to generate the object detection result, the instance segmentation result and the pose estimation result of the object further comprises:
utilizing the pixel head, the at least one instance head and the combining circuit in the predetermined model of the single deep learning network to convert the at least one feature map into the object detection result, the instance segmentation result and the pose estimation result of the object to obtain the object detection result, the instance segmentation result and the pose estimation result at a same time, having no need to perform any association operation between any two processing results among the object detection result, the instance segmentation result and the pose estimation result.

7. The video processing method of claim 6, wherein any pixel among multiple pixels in the input image data is arranged to act as a proposal corresponding to an instance in the predetermined model of the single deep learning network.

8. The video processing method of claim 1, wherein the object represents any object among multiple objects in the input image data, wherein the object detection result, the instance segmentation result, and the pose estimation result represent an object detection result of the any object among multiple object detection results of the multiple objects, an instance segmentation result of the any object among multiple instance segmentation results of the multiple objects, and a pose estimation result of the any object among multiple pose estimation results of the multiple objects, respectively; and time of converting the input image data into the multiple object detection results, the multiple instance segmentation results and the multiple pose estimation results by the predetermined model of the single deep learning network is independent of an object count of the multiple objects.

9. The video processing method of claim 1, wherein the object represents any object among multiple objects in the input image data, wherein the object detection result, the instance segmentation result, and the pose estimation result represent an object detection result of the any object among multiple object detection results of the multiple objects, an instance segmentation result of the any object among multiple instance segmentation results of the multiple objects, and a pose estimation result of the any object among multiple pose estimation results of the multiple objects, respectively; and for a video processing circuit that operates according to the video processing method, power consumption of converting the input image data into the multiple object detection results, the multiple instance segmentation results and the multiple pose estimation results by the predetermined model of the single deep learning network is independent of an object count of the multiple objects.

10. The video processing method of claim 1, wherein in the predetermined model of the single deep learning network, a first task of obtaining the object detection result, a second task of obtaining the instance segmentation result, and a third task of obtaining the pose estimation result are independent of each other.

11. The video processing method of claim 1, wherein in the predetermined model of the single deep learning network, no task of cropping a portion of the input image data is required, and no task of cropping a portion of any feature map among the at least one feature map is required.

12. The video processing method of claim 1, wherein calculating the trinity score of the any partial feature map among the multiple partial feature maps further comprises:
calculating an average of a box score, an instance segmentation score and a pose score of the any partial feature map to be the trinity score, wherein the box score, the instance segmentation score and the pose score correspond to object detection, instance segmentation and pose estimation, respectively.

13. A video processing circuit, for detecting a location, pixels, and a skeleton of an object, the video processing circuit comprising:
a first processing circuit, configured to act as a backbone network in a predetermined model of a single deep learning network to receive input image data having the object and to convert the input image data into at least one feature map; and a second processing circuit, coupled to the first processing circuit, configured to act as a pixel head in the predetermined model of the single deep learning network to receive the at least one feature map and convert the at least one feature map into first processing results, and configured to act as at least one instance head in the predetermined model of the single deep learning network to receive the at least one feature map and to convert the at least one feature map into second processing results, the second processing circuit comprising:
- a combining circuit configured to perform post-processing on the first processing results and the second processing results to generate an object detection result, an instance segmentation result and a pose estimation result of the object, for indicating the location, the pixels, and the skeleton of the object, respectively;

wherein the video processing circuit is configured to perform trinity-score-based training of the predetermined model of the single deep learning network, the trinity-score-based training comprising:

extracting a target feature map from a target input image and dividing the target feature map into multiple partial feature maps of the target feature map;

calculating a trinity score of any partial feature map among the multiple partial feature maps; and according to the trinity score, determining whether to use the any partial feature map in the trinity-score-based training.

14. The video processing circuit of claim 13, further comprising:
- a third processing circuit, coupled to the second processing circuit, configured to perform image processing on the input image data to highlight the object with the object detection result, the instance segmentation result and the pose estimation result on an output image corresponding to the input image data, respectively, to indicate the location, the pixels, and the skeleton of the object, respectively.

15. The video processing circuit of claim 13, wherein the input image data is image data of an input image, and the input image is a red-green-blue (RGB) image.

16. The video processing circuit of claim 13, wherein the object is a human object, and the object detection result is a human detection result.

17. The video processing circuit of claim 13, wherein the object detection result of the object, the instance segmentation result of the any and the pose estimation result of the object share a same instance.

18. The video processing circuit of claim 17, wherein the second processing circuit is configured to act as the pixel head in the predetermined model of the single deep learning network to convert the at least one feature map into first processing results, configured to act as the at least one instance head in the predetermined model of the single deep learning network to convert the at least one feature map into the second processing results, and the combining circuit is configured to perform post-processing on the first processing results and the second processing results to generate the object detection result, the instance segmentation result and the pose estimation result of the object to obtain the object detection result, the instance segmentation result and the pose estimation result at a same time, having no need to perform any association operation between any two processing results among the object detection result, the instance segmentation result and the pose estimation result.

19. The video processing circuit of claim 18, wherein any pixel among multiple pixels in the input image data is arranged to act as a proposal corresponding to an instance in the predetermined model of the single deep learning network.

20. The video processing circuit of claim 13, wherein the object represents any object among multiple objects in the input image data, wherein the object detection result, the instance segmentation result, and the pose estimation result represent an object detection result of the any object among multiple object detection results of the multiple objects, an instance segmentation result of the any object among multiple instance segmentation results of the multiple objects, and a pose estimation result of the any object among multiple pose estimation results of the multiple objects, respectively; and time of converting the input image data into the multiple object detection results, the multiple instance segmentation results and the multiple pose estimation results by the predetermined model of the single deep learning network is independent of an object count of the multiple objects.

21. The video processing circuit of claim 13, wherein the object represents any object among multiple objects in the input image data, wherein the object detection result, the instance segmentation result, and the pose estimation result represent an object detection result of the any object among multiple object detection results of the multiple objects, an instance segmentation result of the any object among multiple instance segmentation results of the multiple objects, and a pose estimation result of the any object among multiple pose estimation results of the multiple objects, respectively; and power consumption of converting the input image data into the multiple object detection results, the multiple instance segmentation results and the multiple pose estimation results by the predetermined model of the single deep learning network is independent of an object count of the multiple objects.

22. The video processing circuit of claim 13, wherein in the predetermined model of the single deep learning network, a first task of obtaining the object detection result, a second task of obtaining the instance segmentation result, and a third task of obtaining the pose estimation result are independent of each other.

23. The video processing circuit of claim 13, wherein in the predetermined model of the single deep learning network, no task of cropping a portion of the input image data is required, and no task of cropping a portion of any feature map among the at least one feature map is required.

24. The video processing circuit of claim 13, wherein calculating the trinity score of the any partial feature map among the multiple partial feature maps further comprises:
- calculating an average of a box score, an instance segmentation score and a pose score of the any partial feature map to be the trinity score, wherein the box score, the instance segmentation score and the pose score correspond to object detection, instance segmentation and pose estimation, respectively.

25. A video processing method, for detecting a location, pixels, and a skeleton of an object, the video processing method comprising:
- utilizing a backbone network in a predetermined model of a single deep learning network to receive input image data having the object and to convert the input image data into at least one feature map, comprising:
  - utilizing the backbone network together with a feature pyramid network to convert the input image data into a set of first feature maps and extract a set of second feature maps from the set of first feature maps;
utilizing a pixel head in the predetermined model of the single deep learning network to receive the at least one feature map and convert the at least one feature map into first processing results, comprising:
receiving a feature map from the set of second feature maps, and converting the received feature map into the first processing results;
utilizing at least one instance head in the predetermined model of the single deep learning network to receive the at least one feature map and convert the at least one feature map into second processing results, comprising:
receiving the set of second feature maps and converting the set of second feature maps into the second processing results; and
utilizing a combining circuit in the predetermined model of the single deep learning network to perform post-processing on the first processing results and second processing results to generate an object detection result, an instance segmentation result and a pose estimation result of the object, for indicating the location, the pixels, and the skeleton of the object, respectively;
wherein the pixel head operates on a feature map from the set of second feature maps with a largest resolution to generate the first processing results for performing instance segmentation and pose estimation in a fine-grained level, and the instance head operates on the set of second feature maps to generate the second processing results for performing object detection and pose estimation in a coarse level.

26. The video processing method of claim 25, wherein the pixel head operates on the feature map from the set of second feature maps with a largest resolution to predict pixel embedding for producing an instance mask, an offsetmap, and an auxiliary heatmap; and the instance head operates on the set of second feature maps to predict person-class probability and boxes for object detection, proposal embedding and margins for instance segmentation, initial keypoints for pose estimation, and trinity scores.

27. A video processing circuit, for detecting a location, pixels, and a skeleton of an object, the video processing circuit comprising:
a first processing circuit, configured to act as a backbone network in a predetermined model of a single deep learning network to receive input image data having the object and to convert the input image data into at least one feature map, wherein the first processing circuit is configured to act as a backbone network together with a feature pyramid network to convert the input image data into a set of first feature maps and extract a set of second feature maps from the set of first feature maps; and
a second processing circuit, coupled to the first processing circuit, configured to act as a pixel head in the predetermined model of the single deep learning network to receive the at least one feature map and convert the at least one feature map into first processing results, wherein the pixel head is configured to receive a feature map from the set of second feature maps, and convert the received feature map into the first processing results, and the second processing circuit is configured to act as at least one instance head in the predetermined model of the single deep learning network and the instance head is configured to receive the set of second feature maps and convert the set of second feature maps into the second processing results, the second processing circuit comprising:
a combining circuit configured to perform post-processing on the first processing results and the second processing results to generate an object detection result, an instance segmentation result and a pose estimation result of the object, for indicating the location, the pixels, and the skeleton of the object, respectively;
wherein the pixel head operates on a feature map from the set of second feature maps with a largest resolution to generate the first processing results for performing instance segmentation and pose estimation in a fine-grained level, and the instance head operates on the set of second feature maps to generate the second processing results for performing object detection and pose estimation in a coarse level.

28. The video processing circuit of claim 27, wherein the pixel head operates on the feature map from the set of second feature maps with a largest resolution to predict pixel embedding for producing an instance mask, an offsetmap, and an auxiliary heatmap; and the instance head operates on the set of second feature maps to predict person-class probability and boxes for object detection, proposal embedding and margins for instance segmentation, initial keypoints for pose estimation, and trinity scores.

* * * * *